US011368762B2

(12) United States Patent
Oishi et al.

(10) Patent No.: US 11,368,762 B2
(45) Date of Patent: Jun. 21, 2022

(54) COMMERCIAL SECTION DETECTION DEVICE, COMMERCIAL SECTION DETECTION METHOD, AND PROGRAM

(71) Applicant: NIPPON TELEGRAPH AND TELEPHONE CORPORATION, Tokyo (JP)

(72) Inventors: Yasunori Oishi, Tokyo (JP); Takahito Kawanishi, Tokyo (JP); Kaoru Hiramatsu, Tokyo (JP); Kunio Kashino, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 15/734,807

(22) PCT Filed: Jun. 3, 2019

(86) PCT No.: PCT/JP2019/021929
§ 371 (c)(1),
(2) Date: Dec. 3, 2020

(87) PCT Pub. No.: WO2019/235405
PCT Pub. Date: Dec. 12, 2019

(65) Prior Publication Data
US 2021/0235166 A1 Jul. 29, 2021

(30) Foreign Application Priority Data

Jun. 5, 2018 (JP) .............................. JP2018-108004

(51) Int. Cl.
*H04N 21/81* (2011.01)
*H04N 21/24* (2011.01)

(52) U.S. Cl.
CPC ....... *H04N 21/812* (2013.01); *H04N 21/2407* (2013.01)

(58) Field of Classification Search
CPC .......... H04N 21/812; H04N 21/44008; H04N 21/4394; H04N 21/4622; H04N 21/42203; H04N 5/268; H04N 21/4334; H04N 21/4402; H04N 21/8106; H04N 21/2665; H04N 21/4126; H04N 21/4345; H04N 21/43615; H04N 21/4367; H04N 21/439
See application file for complete search history.

(56) References Cited

U.S. PATENT DOCUMENTS

2017/0180899 A1* 6/2017 Proctor, Jr. ........ H04N 21/8106

FOREIGN PATENT DOCUMENTS

JP 2000322076 A 11/2000

\* cited by examiner

*Primary Examiner* — Samira Monshi

(57) ABSTRACT

A CM section within a broadcast program is detected with high accuracy. A CM section detection device 100 includes: a CM section detection unit 120 that detects one or more CM sections by comparing a volume of a broadcast program with a volume threshold, and generates detected CM sections representing the CM sections that have been detected; and a CM section correction unit 140 that corrects the detected CM sections based on a sponsorship credit display section that is a section which is included in the broadcast program and in which a sponsorship credit indicating a sponsor of the broadcast program is displayed.

17 Claims, 13 Drawing Sheets

Fig. 12

```
['WordName': '<sp>',    'WordID': 82551,  'WordStartTime': 1230.109985, 'WordEndTime': 1230.189941,
['WordName': 'ニニ',    'WordID': 106781, 'WordStartTime': 1230.189941, 'WordEndTime': 1231.26001,
['WordName': 'から',    'WordID': 99661,  'WordStartTime': 1231.26001,  'WordEndTime': 1231.530029,
['WordName': 'は',      'WordID': 137091, 'WordStartTime': 1231.530029, 'WordEndTime': 1231.689941,
['WordName': '<sp>',    'WordID': 82551,  'WordStartTime': 1231.689941, 'WordEndTime': 1231.839966,
['WordName': '[エ一]',  'WordID': 82556,  'WordStartTime': 1231.839966, 'WordEndTime': 1231.880005,
['WordName': '<sp>',    'WordID': 82551,  'WordStartTime': 1231.880005, 'WordEndTime': 1231.910034,
['WordName': '二冒',    'WordID': 109165, 'WordStartTime': 1231.910034, 'WordEndTime': 1232.329956,
['WordName': 'の',      'WordID': 135996, 'WordStartTime': 1232.329956, 'WordEndTime': 1232.459961,
['WordName': 'スポンサー','WordID': 217740,'WordStartTime': 1232.459961, 'WordEndTime': 1232.9,
['WordName': 'の',      'WordID': 135996, 'WordStartTime': 1232.98999,  'WordEndTime': 1233.130005,
['WordName': '提供',    'WordID': 415033, 'WordStartTime': 1233.130005, 'WordEndTime': 1233.589966,
['WordName': 'で',      'WordID': 127769, 'WordStartTime': 1233.589966, 'WordEndTime': 1233.75,
['WordName': '<sp>',    'WordID': 82551,  'WordStartTime': 1233.75,     'WordEndTime': 1233.910034,
['WordName': '[エ一]',  'WordID': 82556,  'WordStartTime': 1233.910034, 'WordEndTime': 1233.939941,
['WordName': '<sp>',    'WordID': 82551,  'WordStartTime': 1233.939941, 'WordEndTime': 1233.969971,
['WordName': 'お',      'WordID': 91844,  'WordStartTime': 1233.969971, 'WordEndTime': 1234.0,
['WordName': '送り',    'WordID': 530289, 'WordStartTime': 1234.0,      'WordEndTime': 1234.359985,
['WordName': 'します',  'WordID': 112908, 'WordStartTime': 1234.359985, 'WordEndTime': 1234.75,
['WordName': '<sp>',    'WordID': 82551,  'WordStartTime': 1234.75,     'WordEndTime': 1234.780029,
['WordName': '<sp>',    'WordID': 82551,  'WordStartTime': 1234.780029, 'WordEndTime': 1235.670044,
```

US 11,368,762 B2

COMMERCIAL SECTION DETECTION DEVICE, COMMERCIAL SECTION DETECTION METHOD, AND PROGRAM

CROSS-REFERENCE TO RELATED APPLICATIONS

This application is a U.S. 371 Application of International Patent Application No. PCT/JP2019/021929, filed on 3 Jun. 2019, which application claims priority to and the benefit of JP Application No. 2018-108004, filed on 5 Jun. 2018, the disclosures of which are hereby incorporated herein by reference in their entireties.

TECHNICAL FIELD

The present invention relates to a CM section detection device, a CM section detection method, and a broadcast program that detect a section for a commercial (hereinafter referred to as "CM" (commercial message)) included in a computer program.

BACKGROUND ART

Conventionally, a method of determining a CM portion included in a broadcast program that is broadcast through television broadcasting has been known. For example, PTL 1 describes a CM portion recognition device that determines a CM portion by making use of a drop in the volume of sound reproduced between a broadcast program main part and a CM below a predetermined value.

Specifically, the CM portion recognition device described in PTL 1 regards a time slot in which the volume falls below the predetermined value fora predetermined period (e.g., 0.1 seconds) or more as a blank, and determines an interval between two neighboring blanks as a CM portion.

CITATION LIST

Patent Literature

[PTL 1] Japanese Patent Application Publication No. 2000-322076

SUMMARY OF THE INVENTION

Technical Problem

In recent years, there is demand for automatic determination of CM sections during a broadcast program in order to analyze, for example, the experience in broadcasting of CMs or the tendency of viewing of CMs. However, according to a CM portion recognition device described in PTL 1, as a blank has a width, it is difficult to accurately determine which time point in this width is a CM boundary. It is also difficult to detect a CM boundary immediately before or immediately after a broadcast program main part.

An object of the present invention, which has been made in view of the above-described problem, is to provide a CM section detection device, a CM section detection method, and a computer program that can detect CM sections during a broadcast program with high accuracy.

Means for Solving the Problem

To solve the above-described problem, a CM section detection device according to the present invention is a CM section detection device that detects a section of a CM included in a broadcast program, and includes: a CM section detection unit that detects one or more CM sections by comparing a volume of a broadcast program with a volume threshold, and generates detected CM sections representing the CM sections that have been detected; and a CM section correction unit that corrects the detected CM sections based on a sponsorship credit display section that is a section which is included in the broadcast program and in which a sponsorship credit indicating a sponsor of the broadcast program is displayed.

Also, to solve the above-described problem, a CM section detection method according to the present invention is a CM section detection method in a CM section detection device that detects a section of a CM included in a broadcast program, and includes: detecting one or more CM sections by comparing a volume of a broadcast program with a volume threshold, and generating detected CM sections representing the CM sections that have been detected; and correcting the detected CM sections based on a sponsorship credit display section that is a section which is included in the broadcast program and in which a sponsorship credit indicating a sponsor of the broadcast program is displayed.

Furthermore, to solve the above-described problem, a computer program according to the present invention causes a computer to function as the above-described CM section detection device.

Effects of the Invention

According to the present invention, CM sections during a broadcast program can be detected with high accuracy.

BRIEF DESCRIPTION OF DRAWINGS

FIG. 12 is a figure showing an example of the result of sound recognition by the sound recognition unit in the CM section detection device according to an embodiment of the present invention.

DESCRIPTION OF EMBODIMENTS

The following describes an embodiment of the present invention in detail with reference to the figures.

Figure 1:
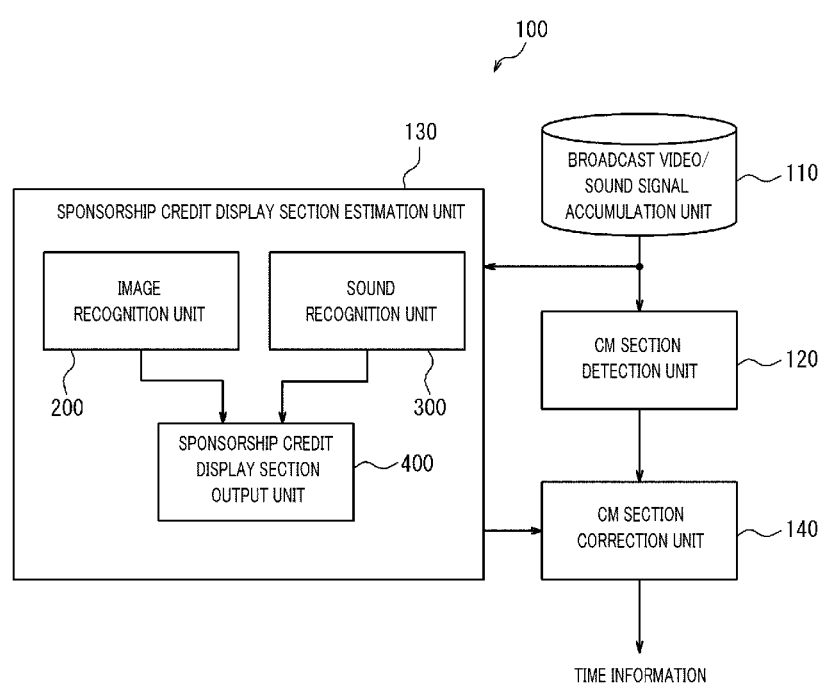
FIG. 1 is a figure showing an exemplary configuration of a CM section detection device according to an embodiment of the present invention.

FIG. 1 is a figure showing an exemplary configuration of a CM section detection device according to an embodiment of the present invention. ACM section detection device 100 shown in FIG. 1 includes a broadcast video/sound signal accumulation unit 110, a CM section detection unit 120, a sponsorship credit display section estimation unit 130, and a CM section correction unit 140. The CM section detection device 100 detects a section of a CM included in a broadcast program using a section which is included in the broadcast program and in which sponsorship credits indicating sponsors of the broadcast program are displayed (hereinafter referred to as "sponsorship credit display section").

The broadcast video/sound signal accumulation unit 110 accumulates broadcast video/sound signals obtained by encoding broadcast programs based on a fixed time length (e.g., 65 minutes). The broadcast video/sound signal accumulation unit 110 stores, for example, signals obtained by encoding video signals of broadcast programs using the H.264 method, as well as signals obtained by encoding sound signals of broadcast programs using the AAC (Advanced Audio Coding) method, in an MP4 file format. Note that the broadcast video/sound signal accumulation unit 110 is not limited to accumulating video/sound signals of broadcast programs for broadcasting, and may accumulate video/sound signals of broadcast programs for Internet distribution.

The CM section detection unit 120 obtains sound signals of a broadcast program targeted for detection of a sponsorship credit display from the broadcast video/sound signal accumulation unit 110, detects one or more CM sections within the broadcast program by comparing the magnitude (volume) of sound signals within the broadcast program with a volume threshold, generates detected CM sections that represent the CM sections that have been detected, and outputs the detected CM sections to the CM section correction unit 140.

In order to detect CM sections more accurately, the CM section detection unit 120 detects one or more CM sections by comparing a CM prescribed length with an interval between detected cut points. Here, the CM prescribed length is the length of one CM, and is prescribed as, for example, 15 seconds, 30 seconds, or 60 seconds. Cut points denote time points of reproduction of frames in which the broadcast program volume in the sound signals of the broadcast program targeted for detection of the sponsorship credit display, which have been obtained from the broadcast video/sound signal accumulation unit 110, is lower than the volume threshold and an amount of change from a previous frame is equal to or larger than a pixel change threshold. Then, the CM section detection unit 120 outputs the result of detection of CM sections to the CM section correction unit 140. The details of the CM section detection unit 120 will be described later.

The sponsorship credit display section estimation unit 130 estimates a sponsorship credit display section, and outputs signals indicating the estimation result (in the present embodiment, binary chronological signals) to the CM section correction unit 140. The sponsorship credit display section estimation unit 130 includes an image recognition unit 200, a sound recognition unit 300, and a sponsorship credit display section output unit 400. The sponsorship credit display section estimation unit 130 may be configured to include only one of the image recognition unit 200 and the sound recognition unit 300, in which case the sponsorship credit display section output unit 400 is unnecessary.

The image recognition unit 200 estimates a sponsorship credit display section using a detection model based on video signals of the broadcast program obtained from the broadcast video/sound signal accumulation unit 110, and outputs signals indicating the estimation result (in the present embodiment, binary chronological signals) to the sponsorship credit display section output unit 400. It is assumed that parameters applied to the detection model have been learnt in advance. Here, the learning is performed using learning data that includes both of still images that display a sponsorship credit display and still images that do not display the sponsorship credit display in a broadcast program for learning from which the sponsorship credit display has already been detected. The details of the image recognition unit 200 will be described later.

The sound recognition unit 300 estimates a sponsorship credit display section based on sound signals of the broadcast program obtained from the broadcast video/sound signal accumulation unit 110, and outputs signals indicating the estimation result (in the present embodiment, binary chronological signals) to the sponsorship credit display section output unit 400. The sound recognition unit 300 detects, from the result of sound recognition with respect to the sound signals of the broadcast program, a related term that is included in an announcement of the sponsorship credit display and related to the sponsorship credit display, and estimates a predetermined period based on the appearance time of this related term as a sponsorship credit display section. The details of the sound recognition unit 300 will be described later.

The sponsorship credit display section output unit 400 outputs the intersection or the union of the sponsorship credit display section estimated by the image recognition unit 200 and the sponsorship credit display section estimated by the sound recognition unit 300 to the CM section correction unit 140 as a final sponsorship credit display section. In the present embodiment, as the sponsorship credit display section is represented by binary chronological signals, the union is obtained by a logical OR operation, and the intersection is obtained by a logical AND operation.

The CM section correction unit 140 corrects the detected CM sections generated by the CM section detection unit 120 based on the sponsorship credit display section estimated by the sponsorship credit display section estimation unit 130, and outputs information indicating the corrected CM sections (in the present embodiment, time information). For example, in a case where a sampling interval of binary chronological signals is 1 second and the 300th to 310th signals are represented by a continuous sequence of signals "1" as a result of correcting a CM section, 5 minutes and 00 seconds to 5 minutes and 10 seconds is used as time information of the CM section.

Figure 2:
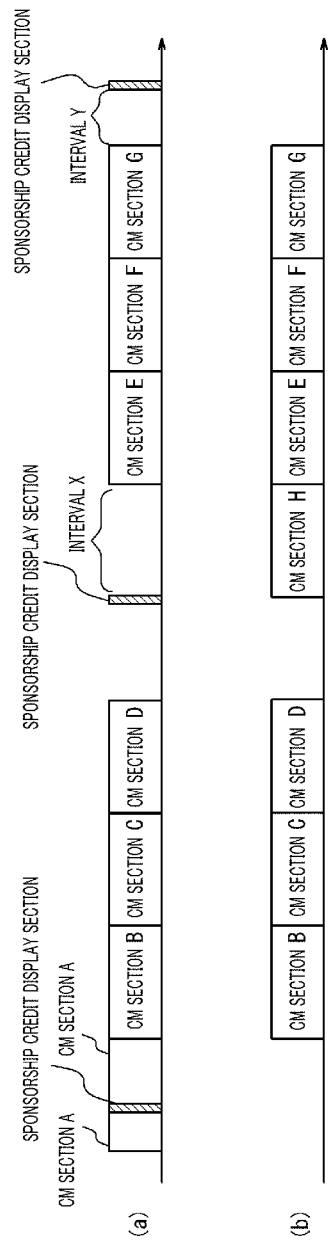
FIG. 2 is a figure for describing processing by a CM section correction unit in the CM section detection device according to an embodiment of the present invention.

FIG. 2 is a figure for describing processing by the CM section correction unit 140. FIG. 2(*a*) shows detected CM sections (CM sections A to G) generated by the CM section detection unit 120 and a sponsorship credit display section estimated by the sponsorship credit display section estimation unit 130, and FIG. 2(*b*) shows detected CM sections after the correction processing by the CM section correction unit 140.

A sponsorship credit display section is not included in a CM section. Thus, when a sponsorship credit display section detected by the sponsorship credit display section estimation unit 130 is included within a CM section detected by the CM section detection unit 120, the CM section correction unit 140 regards this CM section as an erroneous detection, and excludes this CM section from detected CM sections. In the example shown in FIG. 2(*a*), as a sponsorship credit display section is included within the CM section A, the CM section correction unit 140 regards the CM section A as an erroneous detection, and the CM section A is excluded from detected CM sections as shown in FIG. 2(*b*).

Also, it is often the case that a CM is broadcast immediately before or immediately after a sponsorship credit display section. Thus, when a sponsorship credit display section detected by the sponsorship credit display section estimation unit 130 exists outside a detected CM section detected by the CM section detection unit 120, the CM section correction unit 140 compares an interval between this CM section and this sponsorship credit display section with a predetermined period to determine whether to add this interval to detected CM sections. Specifically, only when the difference between an interval between a CM section and a sponsorship credit display section and the predetermined period is smaller than a period threshold, the CM section correction unit 140 regards this interval as a CM section and adds this interval to detected CM sections. For example, when an interval between a CM section and a sponsorship credit display section is substantially the CM prescribed length (e.g., 15 seconds), this interval is regarded as a CM section and added to detected CM sections. In the example shown in FIG. 2(*a*), a sponsorship credit display section exists before the CM section E and after the CM section G. When a period of the difference between an interval X between the CM section E and the sponsorship credit display section and the predetermined period is smaller than the period threshold, the CM section correction unit 140 regards the interval X as a CM section, and adds the interval X as a CM section H to detected CM sections as shown in FIG. 2(*b*). When a period of the difference between an interval Y between the CM section G and the sponsorship credit display section and the predetermined period is equal to or larger than the period threshold, the CM section correction unit 140 does not regard the interval Y as a CM section, and does not add the interval Y to detected CM sections as shown in FIG. 2(*b*).

Although there is a case where a sponsorship credit display section is erroneously detected as a CM section, as well as a case where a CM section immediately before or immediately after a broadcast program itself cannot be detected, before correction of detected CM sections, the CM section correction unit 140 can correct erroneous detection and missed detection of a CM section.

<CM Section Detection Unit>

Figure 3:
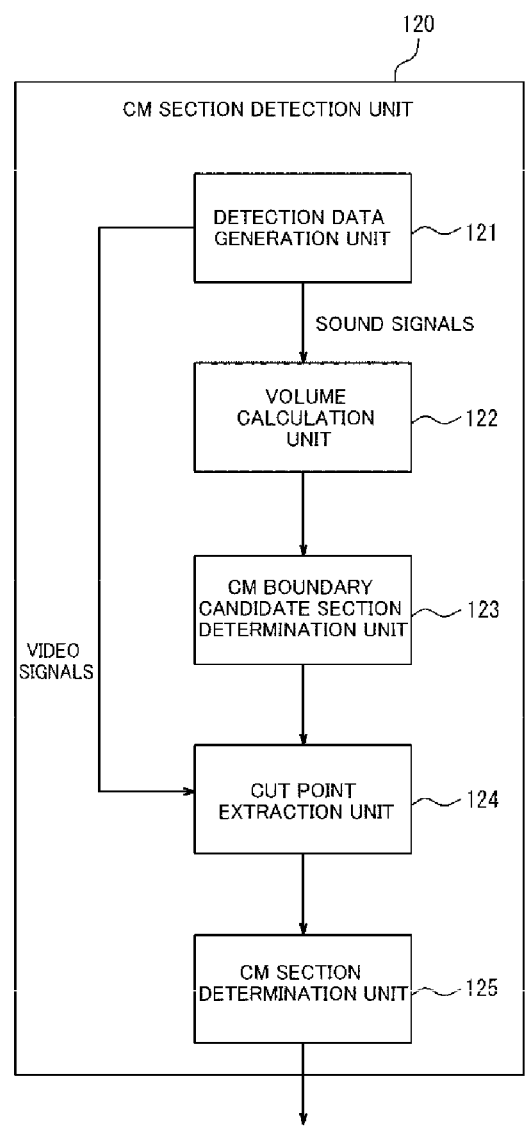
FIG. 3 is a figure showing an exemplary configuration of a CM section detection unit in the CM section detection device according to an embodiment of the present invention.

Next, the details of the CM section detection unit 120 will be described. FIG. 3 is a figure showing an exemplary configuration of the CM section detection unit 120. The CM section detection unit 120 includes a detection data generation unit 121, a volume calculation unit 122, a CM boundary candidate section determination unit 123, a cut point extraction unit 124, and a CM section determination unit 125.

The detection data generation unit 121 decodes sound signals obtained from the broadcast video/sound signal accumulation unit 110, generates sound signals for CM section detection in a predetermined format (e.g., WAV format, 16 kHz, 16 bits, monophonic sound signals), and outputs the sound signals for CM section detection to the volume calculation unit 122. The detection data generation unit 121 also decodes video signals obtained from the broadcast video/sound signal accumulation unit 110, generates chronologically continuous still images at a predetermined time interval, and outputs the still images to the cut point extraction unit 124.

The volume calculation unit 122 calculates chronological volumes of sound data, and outputs the calculation results to the CM boundary candidate section determination unit 123.

The CM boundary candidate section determination unit 123 detects, from the chronological data of volumes calculated by the volume calculation unit 122, a plurality of low-volume sections in which the volume is lower than the volume threshold for a predetermined period (e.g., 0.1 seconds) or more, and detects a portion in which an interval between low-volume sections is substantially the CM prescribed length (the difference from the CM prescribed length is smaller than an error threshold) as a CM. Then, the CM boundary candidate section determination unit 123 determines a time slot including a low-volume section at an end portion of the detected CM as a CM boundary candidate section. That is to say, when the difference between an interval between low-volume sections and the CM prescribed length is smaller than the error threshold, the CM boundary candidate section determination unit 123 determines, as a CM boundary candidate section, a section obtained by adding a predetermined period to the front and the rear of such a low-volume section. Note that a CM boundary is a time point that separates two continuous CMs, and a time point that separates a broadcast program and a CM.

Figure 4:
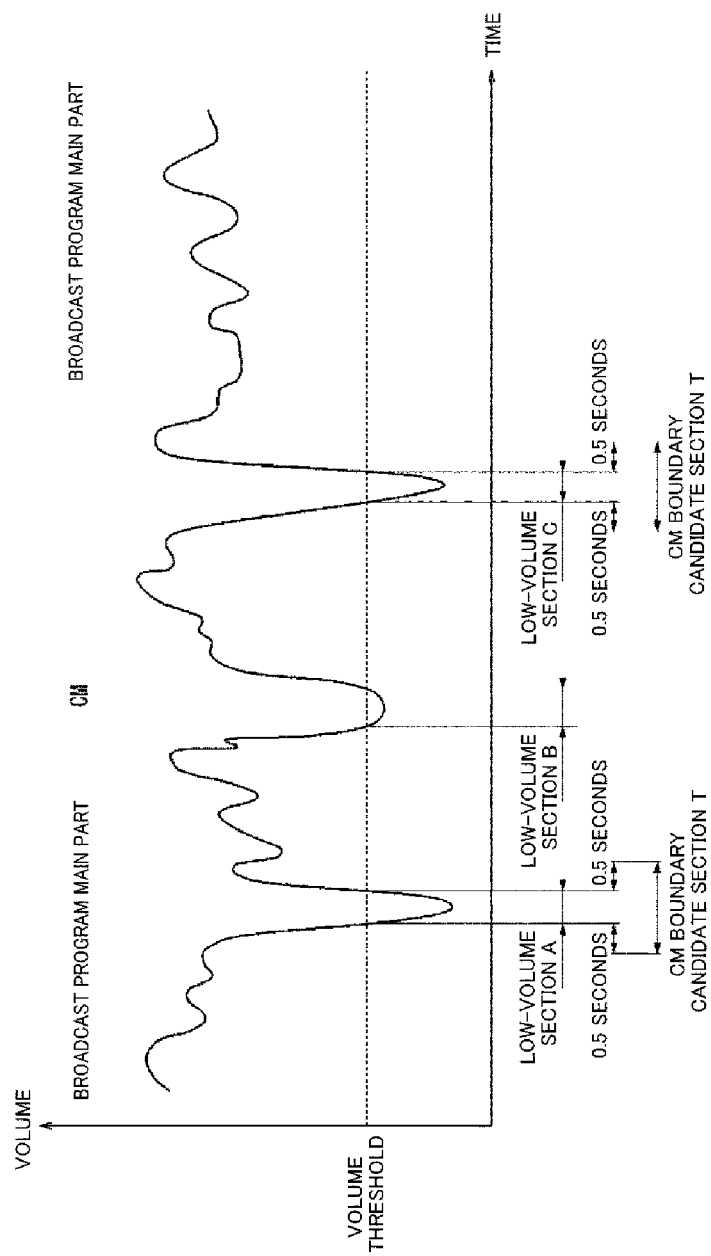
FIG. 4 is a schematic figure showing examples of CM boundary candidate sections in the CM section detection device according to an embodiment of the present invention.

FIG. 4 is a schematic figure showing examples of CM boundary candidate sections. When an interval between a low-volume section A and a low-volume section C is substantially the CM prescribed length, the CM boundary candidate section determination unit 123 detects the interval between the low-volume section A and the low-volume section C as a CM. Then, the CM boundary candidate section determination unit 123 determines each of a section obtained by adding a predetermined period (0.5 seconds according to the examples of FIG. 4) to the front and the rear of the low-volume section A, and a section obtained by adding a predetermined period (0.5 seconds according to the examples of FIG. 4) to the front and the rear of the low-volume section C, as a CM boundary candidate section T.

The cut point extraction unit 124 decodes the video signals obtained from the broadcast video/sound signal accumulation unit 110, and generates chronologically continuous frames. Then, from each of the CM boundary candidate sections $T_k$ (k=1-n (n is an integer equal to or larger than 2)) determined by the CM boundary candidate section determination unit 123, $C\_k$ (an integer equal to or larger than 0) time points of reproduction of frames in which a change amount from a previous frame is equal to or larger than a pixel change threshold within the CM boundary candidate section (hereinafter referred to as "cut points") are extracted. The change amount is a value based on the differences or the ratio between pixel values of each frame and pixel values of a frame previous to the stated each frame. For example, the change amount may be a value based on the differences between pixel values of respective pixels that compose each frame and pixel values of pixels of a previous frame that respectively correspond to the respective pixels of each frame. The value based on the differences is, for example, the sum, the average value, or the median value of absolute values of the differences pertaining to respective pixels, or the mean square value of the differences. Furthermore, the change amount may be the ratio between average values of pixels between neighboring frames. Provided that a reference time point is a start in a case where a broadcast program is reproduced from the beginning, a reproduction time point is a time period that has elapsed since this reference time point. The cut point extraction unit 124 extracts reproduction time points of frames in which the change amount is equal to or larger than the pixel change threshold as cut points. For example, the cut point extraction unit 124 may regard reproduction time points of frames in which both of the ratio of and the difference in the change amount is equal to or larger than the pixel change threshold as cut points. Note that in an experiment, it is often the case that approximately six to eight cut points are extracted from each CM boundary candidate section T.

Figure 5:
FIG. 5 is a figure showing examples of cut points in the CM section detection device according to an embodiment of the present invention.

FIG. 5 is a figure showing examples of cut points. According to these examples, the cut point extraction unit 124 extracts two cut points $P_{11}$, $P_{12}$ from the CM boundary candidate section $T_1$, extracts three cut points $P_{21}$, $P_{22}$, $P_{12}$ from the CM boundary candidate section $T_2$, extracts one cut point $P_{31}$ from the CM boundary candidate section $T_3$, and extracts two cut points $P_{k1}$, $P_{k2}$ from the CM boundary candidate section $T_k$.

The CM section determination unit 125 selects a cut point in each CM boundary candidate section T so as to reduce the differences from the CM prescribed length, determines a section between selected cut points as a CM section, and outputs information indicating the determined CM section to the CM section correction unit 140.

Specifically, the CM section determination unit 125 generates a plurality of cut point sequences $S_j$ composed of combinations of cut points that have each been selected from a different one of the CM boundary candidate sections. The cut point sequences $S_j$ are combinations of cut points that were respectively selected from the plurality of CM boundary candidate sections, and the total number $C_{all}$ of the cut point sequences $S_j$ is as shown in formula (1). Note that when no cut point has been detected from the CM boundary candidate section $T_k$, it is assumed that C_k=1.

$$C_{all}=C\_1 \times C\_2 \times \ldots \times C\_k \times \ldots \times C\_n \qquad (1)$$

Then, the CM section determination unit 125 determines a cut point sequence that has the smallest sum of differences in a neighboring cut point period, which is a period between cut points that have each been selected in a different one of neighboring CM boundary candidate sections, and determines a section between cut points in this cut point sequence as a CM section. A neighboring cut point period is a period between one cut point within a CM boundary candidate section $T_k$ and one cut point within a CM boundary candidate section $T_{k-1}$.

For example, the CM section determination unit 125 calculates the difference between each neighboring cut point period and the CM prescribed length. In consideration of the influence of noise, the CM section determination unit 125 calculates, for each cut point sequence $S_j$, the number of the differences that are smaller than a period difference threshold (hereinafter referred to as "the number of matches"). The period difference threshold is, for example, a period in which a predetermined number of frames of a broadcast video are reproduced; when the predetermined number of frames is 2 frames and the frame rate of the broadcast video is 30 fps, the period difference threshold is (2/30) seconds.

Processing of the CM section determination unit 125 will be described with reference to FIG. 6. Here, it is assumed that the CM boundary candidate section determination unit 123 has determined three CM boundary candidate sections $T_1$-$T_3$, and the cut point extraction unit 124 has extracted two cut points $P_{11}$, $P_{12}$ from the CM boundary candidate section $T_1$, extracted three cut points $P_{21}$, $P_{22}$, $P_{23}$ from the CM boundary candidate section $T_2$, and extracted one cut point $P_{31}$ from the CM boundary candidate section $T_3$.

Figure 6:
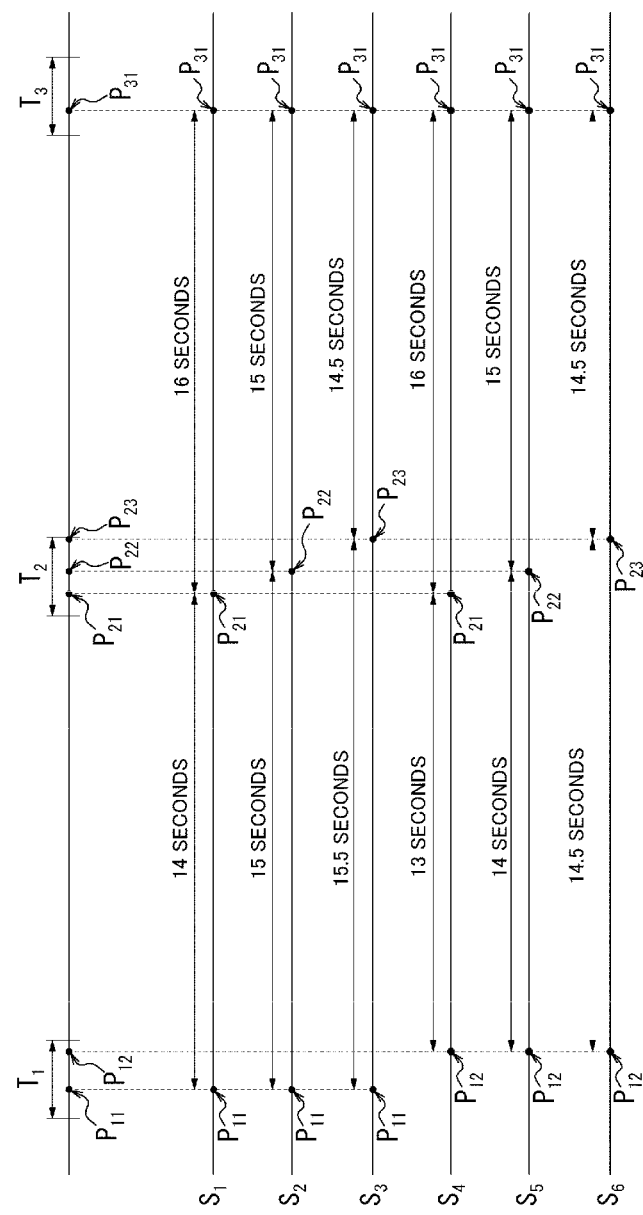
FIG. 6 is a figure for describing processing of a CM section determination unit in the CM section detection device according to an embodiment of the present invention.

In the example shown in FIG. 6, the total number $C_{all}$ of the cut point sequences $S_j$ is $C\_1 \times C\_2 \times C\_3 = 2 \times 3 \times 1 = 6$. The cut point sequence $S_1$ is a sequence composed of the combination of the cut points $P_{11}$, $P_{21}$, $P_{31}$, the cut point sequence $S_2$ is a sequence composed of the combination of the cut points $P_{11}$, $P_{22}$, $P_{31}$, the cut point sequence $S_3$ is a sequence composed of the combination of the cut points $P_{11}$, $P_{23}$, $P_{31}$, the cut point sequence $S_4$ is a sequence composed of the combination of the cut points $P_{12}$, $P_{21}$, $P_{31}$, the cut point sequence $S_5$ is a sequence composed of the combination of the cut points $P_{12}$, $P_{22}$, $P_{31}$, and the cut point sequence $S_6$ is a sequence composed of the combination of the cut points $P_{12}$, $P_{23}$, $P_{31}$.

The CM section determination unit 125 calculates the difference between each neighboring cut point period and the CM prescribed length in each cut point sequence $S_j$ (j=1 to 6). Provided that the CM prescribed length is 15 seconds and a predetermined range is (2/30) seconds, the CM section determination unit 125 yields 0, 2, 0, 0, 1, 0 as the number of matches in the cut point sequences $S_1$ to $S_6$, respectively.

When there is one cut point sequence $S_j$ that has the largest number of matches, the CM section determination unit 125 determines this cut point sequence $S_j$ as a boundary sequence; when there are a plurality of cut point sequences $S_j$ that have the largest number of matches, the CM section determination unit 125 determines, among the plurality of cut point sequences $S_j$ that have the largest number of matches, a cut point sequence $S_j$ that has the smallest sum of differences between the respective neighboring cut point periods and the CM prescribed length as the boundary sequence. In the example shown in FIG. 6, as there is one cut point sequence that has the largest number of matches, namely the cut point sequence $S_2$, among the cut point sequences $S_1$-$S_6$, the CM section determination unit 125 determines the cut point sequence $S_2$ as the boundary sequence. Then, when the boundary sequence includes cut points whose neighboring cut point period substantially matches the CM prescribed length, the CM section determination unit 125 can regard these cut points as CM boundaries. Therefore, the CM section determination unit 125 determines a section between cut points whose neighboring cut point period substantially matches the CM prescribed length as a CM section.

Also, the CM section determination unit 125 determines a CM boundary of a CM boundary candidate section that does not include a cut point whose neighboring cut point period substantially matches the CM prescribed length (hereinafter referred to as "effective cut point") in the boundary sequence based on a CM boundary determined in a neighboring CM boundary candidate section and the CM prescribed length. A specific example of this case will be described with reference to FIG. 7 and FIG. 8.

Figure 7:
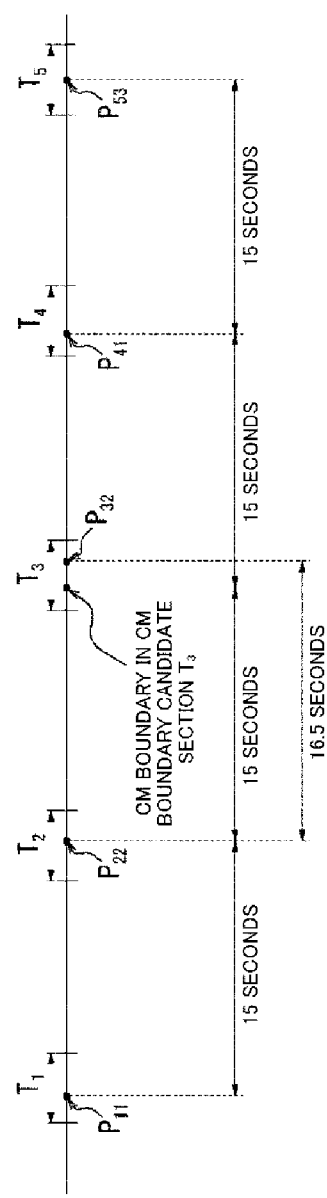
FIG. 7 is a figure showing a first example of determination of a CM boundary in the CM section detection device according to an embodiment of the present invention.

FIG. 7 is a figure showing a first example of determination of a CM boundary of a CM boundary candidate section that does not include an effective cut point. In the first example of determination, the CM section determination unit 125 determines a time point at which a period from a CM boundary in a neighboring CM boundary candidate section substantially matches the CM prescribed length as a CM boundary. In the example shown in FIG. 7, a boundary sequence is a cut point sequence composed of cut points $P_{11}$, $P_{22}$, $P_{32}$, $P_{41}$, $P_{53}$. With this boundary sequence, it is assumed that the CM section determination unit 125 has determined that: with respect to the cut point $P_{22}$, a neighboring cut point period matches the CM prescribed length of 15 seconds; and with respect to the cut point $P_{32}$, as a neighboring cut point period is 16.5 seconds, the difference between the neighboring cut point period and the CM prescribed length is equal to or larger than the time difference threshold, and the CM boundary candidate section $T_3$ is a CM boundary candidate section that does not include an effective cut point.

In this case, the CM section determination unit 125 determines the cut point $P_{22}$ as a CM boundary in the CM boundary candidate section $T_2$. The CM section determination unit 125 also determines a time point obtained by adding, to the cut point $P_{22}$, a period obtained by adding or subtracting an allowable period to or from the CM prescribed length as a CM boundary in the CM boundary candidate section $T_3$ that does not include an effective cut point. The allowable period is a period that varies with each CM boundary candidate section. The allowable periods of the respective CM boundary candidate sections are adjusted so that the sum of periods obtained by adding or subtracting the allowable periods to or from the CM prescribed length matches a reproduction period of the whole CMs.

Figure 8:
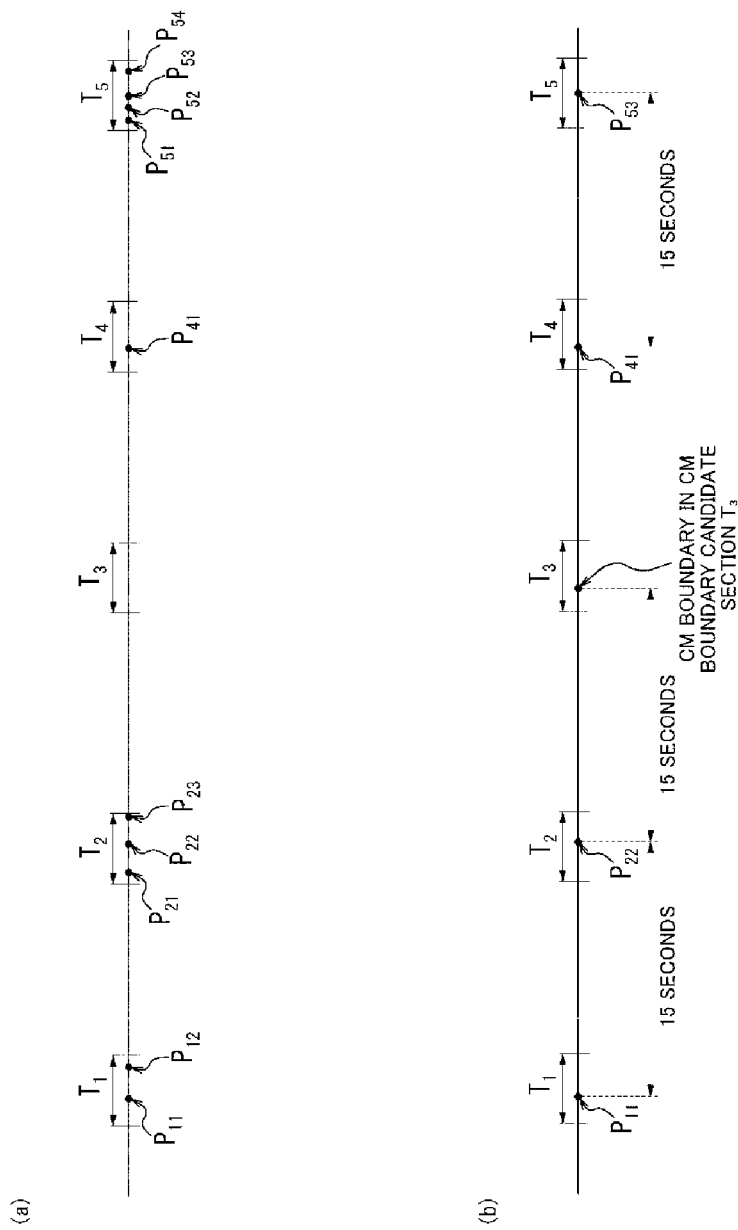
FIG. 8 is a figure showing a second example of determination of a CM boundary in the CM section detection device according to an embodiment of the present invention.

FIG. 8 is a figure showing a second example of determination of a CM boundary of a CM boundary candidate section that does not include an effective cut point. In the second example of determination, when the cut point extraction unit 124 has not extracted a cut point in a CM boundary candidate section $T_k$, the CM section determination unit 125 determines a time point at which a period from a CM boundary in a neighboring CM boundary candidate section substantially matches the CM prescribed length as a CM boundary. For example, when a video is blacked out in the vicinity of a CM boundary, a cut point may not be extracted in a CM boundary candidate section.

In the example shown in FIG. 8 (a), a boundary sequence is a cut point sequence composed of cut points $P_{11}$, $P_{22}$, $P_{41}$, $P_{53}$, and a CM boundary candidate section $T_3$ does not include any cut points. In this case, as shown in FIG. 8(b), the CM section determination unit 125 determines a time point obtained by adding, to a CM boundary (cut point $P_{22}$) extracted in a CM boundary candidate section $T_2$ that is previous to the CM boundary candidate section $T_3$, a period obtained by adding or subtracting the allowable period to or from the CM prescribed length as a CM boundary in the CM boundary candidate section $T_3$. In this way, even when a change amount in a video is small and no cut point has been extracted in a CM boundary candidate section, a CM boundary can be accurately detected.

Note that the CM section determination unit 125 may perform the foregoing processing after dividing a broadcast program so that a period required to determine a CM section is equal to or shorter than the allowable period. For example, the CM section determination unit 125 calculates the total number $C_{all}$ of cut point sequences $S_j$ included in the respective divided broadcast programs; when the total number $C_{all}$ is equal to or smaller than a threshold, the broadcast program is not divided, and when the total number $C_{all}$ exceeds the threshold, the broadcast program is divided so that the total number $C_{all}$ of cut point sequences $S_n$ of the divided broadcast program is equal to or smaller than the threshold. At this time, the CM section determination unit 125 divides the broadcast program at the positions of cut points. This can prevent the broadcast program from being divided at time points that are estimated to be in the middle of a CM between cut points. Also, the CM section determination unit 125 may equally divide the broadcast program so that the differences between the lengths of the divided broadcast programs fall within a predetermined range, and may divide the broadcast program so that the total number $C_{all}$ of cut point sequences $S_j$ in the divided broadcast programs has a prescribed value.

<Image Recognition Unit>

Figure 9:
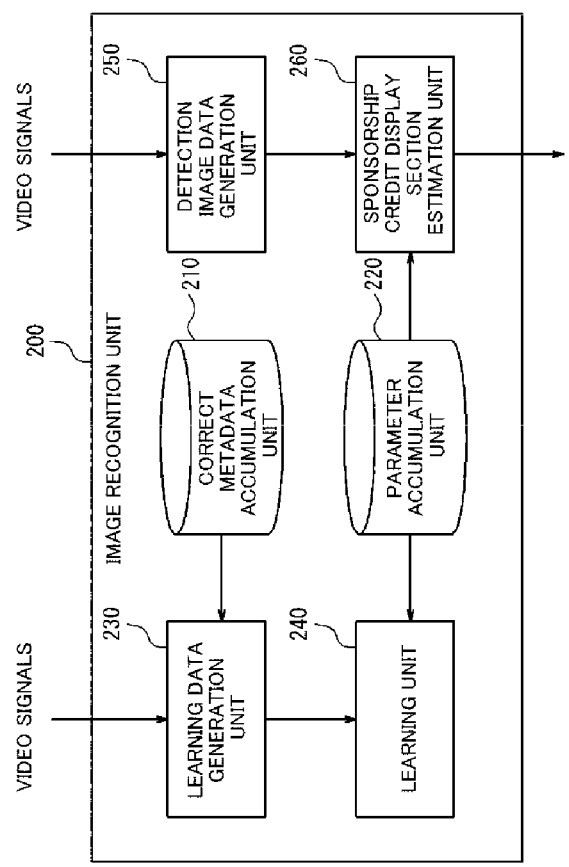
FIG. 9 is a figure showing an exemplary configuration of an image recognition unit in the CM section detection device according to an embodiment of the present invention.

Next, the details of the image recognition unit 200 will be described. FIG. 9 is a figure showing an exemplary configuration of the image recognition unit 200. The image recognition unit 200 shown in FIG. 9 includes a correct metadata accumulation unit 210, a parameter accumulation unit 220, a learning data generation unit 230, a learning unit 240, a detection image data generation unit 250, and a sponsorship credit display section estimation unit 260.

The correct metadata accumulation unit 210 accumulates time information indicating the time at which a sponsorship credit display in a broadcast program was displayed. The time at which the sponsorship credit display was displayed is, for example, visually confirmed by a worker in advance and accumulated in the correct metadata accumulation unit 210.

The parameter accumulation unit 220 accumulates later-described parameters that are applied to a detection model for detecting the sponsorship credit display in the broadcast program.

The detection model is, for example, a model that uses a convolutional neural network. Although a detailed explanation is omitted, the convolutional neural network generally has a configuration in which a convolutional layer and a pooling layer are disposed in this order, from the input side, multiple times in a repeated manner, and then fully connected layers are disposed. In the convolutional layers, processing for applying a convolutional filter to an input image is performed. In the pooling layers, processing for applying a rectangular filter to the output from the convolutional layers while sequentially shifting the rectangular filter, and generating a new image with the extraction of the largest value within the rectangular filter, is performed. In the fully connected layers, processing for connecting image data whose feature portions have been extracted by the convolutional layers and the pooling layers to one node, and outputting a value converted by an activation function, is performed. For example, when the detection model is the model that uses the convolutional neural network, the parameter accumulation unit 220 accumulates filter weights of filters that are applied in respective layers, bias parameters that are added to the output from the convolutional layers, and the like. Note that the detection model is not limited to the one constructed using the convolutional neural network, and may be constructed using, for example, an SVM (Support Vector Machine) and the like.

The learning data generation unit 230 obtains, from the broadcast video/sound signal accumulation unit 110, video signals of a broadcast program for learning from which a sponsorship credit display has already been detected. The learning data generation unit 230 also obtains time information of the sponsorship credit display in that broadcast program from the correct metadata accumulation unit 210. The learning data generation unit 230 generates, as learning data, still images that display the sponsorship credit display (hereinafter referred to as "still images with the sponsorship credit display"), as well as still images that do not display the sponsorship credits (hereinafter referred to as "still images without the sponsorship credit display"), from the broadcast program for learning from which the sponsorship credit display has already been detected.

Specifically, the learning data generation unit 230 decodes the obtained video signals, and generates chronologically continuous still images at a predetermined time interval. Note that the still images may be generated using only I frames that have undergone intra-screen encoding. For example, the learning data generation unit 230 generates a still image every second. In this case, for example, with respect to a 65-minute broadcast program, the learning data generation unit 230 generates 3900 chronologically continuous still images at an interval of one second.

Next, based on the obtained time information, the learning data generation unit 230 extracts still images with the sponsorship credit display from the generated still images. The learning data generation unit 230 also extracts still images without the sponsorship credit display from the generated still images. The still images without the sponsorship credit display are randomly extracted from among still images at times other than times indicated by the obtained time information. The learning data generation unit 230 extracts, for example, approximately 8000 still images with the sponsorship credit display and 8000 still images without the sponsorship credit display. The learning data generation unit 230 outputs the extracted still images with the sponsorship credit display and still images without the sponsorship credit display to the learning unit 240 as learning data.

Using the learning data (the still images with the sponsorship credit display and the still images without the sponsorship credit display) generated by the learning data generation unit 230, the learning unit 240 learns parameters that are applied to the detection model for detecting the sponsorship credit display in the broadcast program. For example, when the detection model is the above-described model that uses the convolutional neural network, the learning unit 240 learns filter weights and bias parameters using a stochastic gradient method. The learning unit 240 accumulates the parameters that have been learnt in the parameter accumulation unit 220.

The detection image data generation unit 250 obtains video signals of a broadcast program targeted for detection of a sponsorship credit display from the broadcast video/sound signal accumulation unit 110. The detection image data generation unit 250 decodes the obtained video signals, and generates chronologically continuous still images at a predetermined time interval. For example, the detection image data generation unit 250 generates a still image every second. In this case, for example, with respect to a 65-minute broadcast program, the detection image data generation unit 250 generates 3900 chronologically continuous still images at an interval of one second. The detection image data generation unit 250 outputs the generated chronologically continuous still images to the sponsorship credit display section estimation unit 260.

Using the detection model to which the parameters learnt in advance by the learning unit 240 have been applied, the sponsorship credit display section estimation unit 260 estimates a sponsorship credit display section in the broadcast program targeted for detection of the sponsorship credit display.

Specifically, the sponsorship credit display section estimation unit 260 sequentially inputs image data for detection (the still images of the broadcast program targeted for detection of the sponsorship credit display) output from the detection image data generation unit 250 to the detection model for detecting the sponsorship credit display in the broadcast program. Then, based on output values of the detection model for the respective still images, the sponsorship credit display section estimation unit 260 generates chronological signals that chronologically indicate whether the respective still images include the sponsorship credit display. Here, the sponsorship credit display section estimation unit 260 applies the parameters accumulated in the parameter accumulation unit 220 to the detection model. For example, when the detection model is the model that uses the convolutional neural network, the sponsorship credit display section estimation unit 260 constructs a network (detection model) that uses the parameters accumulated in the parameter accumulation unit 220 as fixed values.

When an output value of the detection model is equal to or larger than a predetermined threshold, the sponsorship credit display section estimation unit 260 determines the input still image as a still image with the sponsorship credit display. On the other hand, when an output value of the detection model is smaller than the predetermined threshold, the sponsorship credit display section estimation unit 260 determines the input still image as a still image without the sponsorship credit display. The sponsorship credit display section estimation unit 260 makes the foregoing determination with respect to each of the chronologically continuous still images of the broadcast program targeted for detection of the sponsorship credit display, generates signals indicating the determination results (in the present embodiment, binary chronological signals), and outputs, to the sponsorship credit display section output unit 400, a signal "1" with respect to a section that is estimated to be the sponsorship credit display section and a signal "0" with respect to other sections.

In general, the sponsorship credit display uses, for example, white letters with black outlines or letters in color as letters indicating sponsor names. Also, the sponsorship credit display uses letters in various types of fonts as letters indicating sponsor names. Furthermore, there are a case where the letters "sponsorship" are included, and a case where the letters "sponsorship" are not included, in the sponsorship credit display. Moreover, there is also a case where the sponsorship credit display includes only sponsor logos. In addition, there is also a case where the position of the sponsorship credit display is the entirety, the lower right, the lower left, the upper right, the upper left, or the lower center of a screen. As such, the sponsorship credit display comes in many variations. It is difficult to detect such sponsorship credit displays of many variations using, for example, feature vectors of objects that appear in images and the like.

In this respect, in the image recognition unit 200, learning data is generated from a broadcast program from which a sponsorship credit display has already been detected, and parameters that are applied to a detection model for detecting a sponsorship credit display in a broadcast program are learnt using this learning data. Then, in the image recognition unit 200, with use of the detection model to which the learnt parameters have been applied, a sponsorship credit display section in the broadcast program targeted for detection of the sponsorship credit display is estimated. Therefore, according to the image recognition unit 200, by using sponsorship credit displays of many variations as learning data, a sponsorship credit display section can be detected also with respect to the aforementioned sponsorship credit displays of many variations. Furthermore, according to the image recognition unit 200, video signals of the broadcast program targeted for detection of the sponsorship credit display are used, and thus a sponsorship credit display section can be detected also when an announcement is not made.

<Exemplary Modification of Image Recognition Unit>

Figure 10:
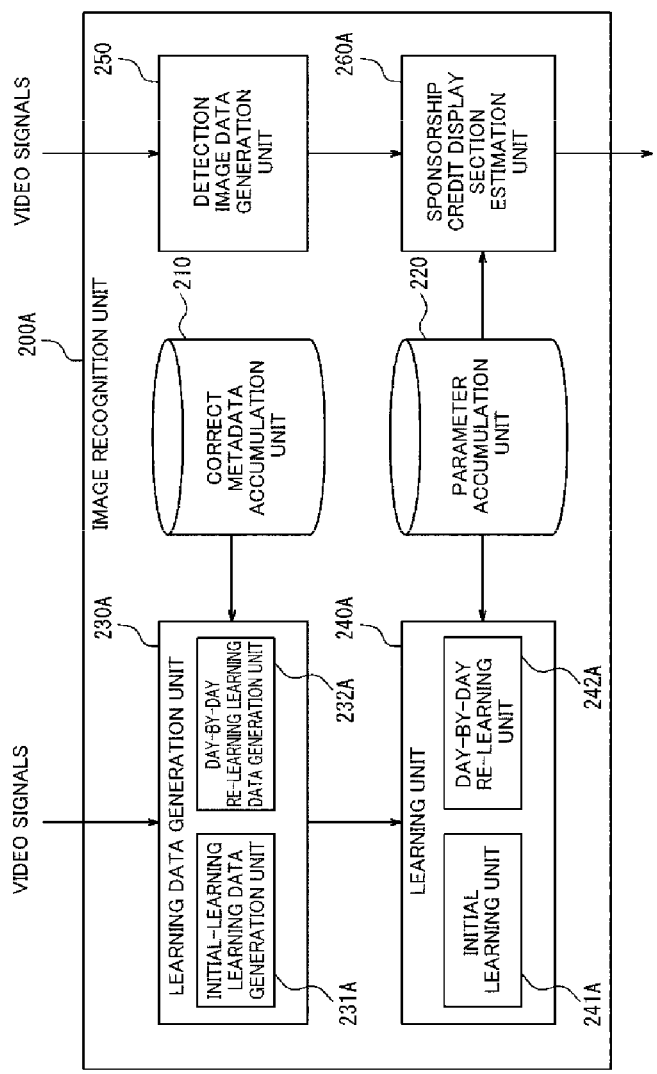
FIG. 10 is a figure showing another exemplary configuration of the image recognition unit in the CM section detection device according to an embodiment of the present invention.

Next, an exemplary modification of the image recognition unit will be described. FIG. 10 is a figure showing another exemplary configuration of the image recognition unit. In FIG. 10, constituents that are similar to those in FIG. 9 are given the same reference signs thereas, and a description thereof will be omitted. An image recognition unit 200A shown in FIG. 10 differs from the image recognition unit 200 shown in FIG. 9 in that the learning data generation unit 230 has been changed to a learning data generation unit 230A, the learning unit 240 has been changed to a learning unit 240A, and the sponsorship credit display section estimation unit 260 has been changed to a sponsorship credit display section estimation unit 260A.

The learning data generation unit 230A obtains video signals of a broadcast program from which a sponsorship credit display has already been detected, on a day-by-day basis, from the broadcast video/sound signal accumulation unit 110. The learning data generation unit 230A also obtains time information of the sponsorship credit displays of such broadcast programs from the correct metadata accumulation unit 210. The learning data generation unit 230A generates learning data of respective days from the obtained broadcast programs of respective days from which the sponsorship credit displays have already been detected, and outputs the learning data to the learning unit 240A. The learning data generation unit 230A includes an initial-learning learning data generation unit 231A and a day-by-day re-learning learning data generation unit 232A.

The initial-learning learning data generation unit 231A obtains video signals of broadcast programs from which sponsorship credit displays have already been detected from the broadcast video/sound signal accumulation unit 110. For example, the initial-learning learning data generation unit 231A obtains video signals of broadcast programs corresponding to one day of one month ago. The initial-learning learning data generation unit 231A also obtains time information of the sponsorship credit displays in the broadcast programs whose video signals have been obtained from the correct metadata accumulation unit 210. Then, the initial-learning learning data generation unit 231A generates learning data for initial learning of a detection model from the obtained broadcast programs from which the sponsorship credit displays have already been detected based on the time information of the sponsorship credit displays in such broadcast programs.

Specifically, the initial-learning learning data generation unit 231A decodes the obtained video signals, and generates chronologically continuous still images at a predetermined time interval (e.g., every second).

Next, based on the obtained time information, the initial-learning learning data generation unit 231A extracts still images with the sponsorship credit displays from the generated still images. The initial-learning learning data generation unit 231A also extracts still images without the sponsorship credit displays from the generated still images. The still images without the sponsorship credit displays are randomly extracted from still images at times other than times indicated by the obtained time information. The initial-learning learning data generation unit 231A extracts, for example, approximately 8000 still images with the sponsorship credit displays and 8000 still images without the sponsorship credit displays. The initial-learning learning data generation unit 231A outputs the extracted still images with the sponsorship credit displays and still images without the sponsorship credit displays to the learning unit 240A as learning data for initial learning of the detection model.

The day-by-day re-learning learning data generation unit 232A obtains video signals of a broadcast program from which a sponsorship credit display has already been detected, on a day-by-day basis, from the broadcast video/sound signal accumulation unit 110. For example, the day-by-day re-learning learning data generation unit 232A obtains video signals of broadcast programs of respective days in a previous week. The day-by-day re-learning learning data generation unit 232A also obtains time information of the sponsorship credit displays in the broadcast programs whose video signals have been obtained from the correct metadata accumulation unit 210. Then, the day-by-day re-learning learning data generation unit 232A generates, on a day-by-day basis, learning data for re-learning of the detection model from the broadcast program from which the sponsorship credit display has already been detected based on the time information of the sponsorship credit display in this broadcast program.

Specifically, the day-by-day re-learning learning data generation unit 232A decodes the obtained broadcast video/sound signals, and generates chronologically continuous still images at a predetermined time interval (e.g., every second).

Next, based on the obtained time information, the day-by-day re-learning learning data generation unit 232A extracts still images with the sponsorship credit display and still images without the sponsorship credit display from the generated still images. The still images without the sponsorship credit display are randomly extracted from still images at times other than times indicated by the obtained time information. The day-by-day re-learning learning data generation unit 232A extracts, for example, approximately 1000 still images with the sponsorship credit display and 1000 still images without the sponsorship credit display. The day-by-day re-learning learning data generation unit 232A performs the foregoing processing on a day-by-day basis. Then, the day-by-day re-learning learning data generation unit 232A outputs the still images with the sponsorship credit displays and the still images without the sponsorship credit displays, which have been extracted for respective days, to the learning unit 240A as day-by-day data for re-learning.

Using the day-by-day learning data generated by the learning data generation unit 230A, the learning unit 240A learns (re-learns) parameters that are applied to the detection model on a day-by-day basis. The learning unit 240A includes an initial learning unit 241A and a day-by-day re-learning unit 242A.

Using the learning data for initial learning that has been generated by the initial-learning learning data generation unit 231A, the initial learning unit 241A learns parameters that are applied to the detection model for detecting the sponsorship credit displays in the broadcast programs. For example, when the detection model is the above-described model that uses the convolutional neural network, the initial learning unit 241A learns filter weights and bias parameters using a stochastic gradient method. The initial learning unit 241A accumulates the parameters that have been learnt in the parameter accumulation unit 220.

Using the data for re-learning of respective days that has been generated by the day-by-day re-learning learning data generation unit 232A, the day-by-day re-learning unit 242A learns, on a day-by-day basis, parameters that are applied to the detection model for detecting the sponsorship credit display in the broadcast program. The day-by-day re-learning unit 242A accumulates the parameters that have been learnt in the parameter accumulation unit 220. That is to say, the day-by-day re-learning unit 242A learns parameters that are applied to the detection model on a day-by-day basis, and accumulates the parameters in the parameter accumulation unit 220. Learning (re-learning) the parameters that are applied to the detection model using the data for re-learning of respective days makes it possible to set parameters that are appropriate for detection of the sponsorship credit displays in the broadcast programs of respective days.

The sponsorship credit display section estimation unit 260A applies, to the detection model, the parameters that have been accumulated in the parameter accumulation unit 220 and have been learnt with respect to a day on which a broadcast program targeted for detection of a sponsorship credit display is broadcast, and estimates a sponsorship credit display section in the broadcast program targeted for detection of the sponsorship credit display.

Specifically, the sponsorship credit display section estimation unit 260A sequentially inputs chronologically continuous still images of the broadcast program targeted for detection of the sponsorship credit display, which have been output from the detection image data generation unit 250, to the detection model for detecting the sponsorship credit display in the broadcast program. Then, based on output values from the detection model for the respective still images, the sponsorship credit display section estimation unit 260A generates chronological signals that chronologically indicate whether the respective still images include the sponsorship credit display. Here, the sponsorship credit display section estimation unit 260A applies, to the detection model, the parameters that have been accumulated in the parameter accumulation unit 220 and have been learnt with respect to a day on which the broadcast program targeted for detection of the sponsorship credit display is broadcast.

For example, when the detection model is the model that uses the convolutional neural network, the sponsorship credit display section estimation unit 260A constructs a network (detection model) that uses the parameters that have been accumulated in the parameter accumulation unit 220 and have been learnt with respect to the day on which the broadcast program targeted for detection of the sponsorship credit display is broadcast as fixed values.

When an output value of the detection model is equal to or larger than a predetermined threshold, the sponsorship credit display section estimation unit 260A determines the input still image as a still image with the sponsorship credit display. On the other hand, when an output value of the detection model is smaller than the predetermined threshold, the sponsorship credit display section estimation unit 260A determines the input still image as a still image without the sponsorship credit display. The sponsorship credit display section estimation unit 260A makes the foregoing determination with respect to each of the chronologically continuous still images of the broadcast program targeted for detection of the sponsorship credit display, generates signals indicating the determination results (in the present embodiment, binary chronological signals), and outputs, to the output unit 140A, a signal "1" with respect to a section that is estimated to be the sponsorship credit display section and a signal "0" with respect to other sections. Note that the sponsorship credit display section estimation unit 260A may construct a day-by-day detection model to which parameters that have been learnt by the learning unit 240A on a day-by-day basis have been applied, and use a detection model corresponding to the day on which the broadcast program targeted for detection of the sponsorship credit display is broadcast.

In general, it is often the case that the same broadcast program is broadcast on the same day every week. There is a tendency that such a broadcast program displays a sponsorship credit display of the same format. Therefore, according to the image recognition unit 200A, the accuracy of detection of the sponsorship credit display can be improved by generating learning data on a day-by-day basis, and by learning parameters that are applied to the detection model using such learning data on a day-by-day basis. Note that although the present embodiment has been described using an example in which the generation of learning data and the learning of parameters that are applied to the detection model are performed on a day-by-day basis, no limitation is intended by this. For example, the generation of learning data and the learning of parameters that are applied to the detection model may be performed separately with respect to a weekday, Saturday, and Sunday. Furthermore, the generation of learning data and the learning of parameters that are applied to the detection model may be performed, for example, on a broadcast program-by-broadcast program basis.

Here, the initial-learning learning data generation unit 231A may extract, from among the generated still images, a still image with the sponsorship credit display and a still image without the sponsorship credit display in pairs with the times at which these still images were broadcast based on the obtained time information, and output the pair of the extracted still image with the sponsorship credit display and the time at which this still image was broadcast and the pair of the still image without the sponsorship credit display and the time at which this still image was broadcast to the learning unit 240A as learning data for initial learning of the detection model. In this case, the initial learning unit 241A learns parameters that are applied to the detection model for detecting the sponsorship credit display in the broadcast program using the learning data for initial learning that was generated by the initial-learning learning data generation unit 231A (the pair of the still image with the sponsorship credit display and the time at which this still image was broadcast, and the pair of the still image without the sponsorship credit display and the time at which this still image was broadcast).

Furthermore, the day-by-day re-learning learning data generation unit 232A may extract, from among the generated still images, a still image with the sponsorship credit display and a still image without the sponsorship credit display in pairs with the times at which these still images were broadcast based on the obtained time information, and output the pair of the still image with the sponsorship credit display and the time at which this still image was broadcast and the pair of the still image without the sponsorship credit display and the time at which this still image was broadcast, which were extracted on a day-by-day basis, to the learning unit 240A as day-by-day data for re-learning. In this case, the day-by-day re-learning unit 242A learns, on a day-by-day basis, parameters that are applied to the detection model for detecting the sponsorship credit display in the broadcast program using the day-by-day data for re-learning that was generated by the day-by-day re-learning learning data generation unit 232A (the pair of the still image with the sponsorship credit display and the time at which this still image was broadcast, as well as the pair of the still image without the sponsorship credit display and the time at which this still image was broadcast, of each day). The day-by-day re-learning unit 242A accumulates the parameters that have been learnt in the parameter accumulation unit 220.

Note that the learning data generation unit 230A may generate the pair of the still image with the sponsorship credit display and the time at which this still image was broadcast, as well as the pair of the still image without the sponsorship credit display and the time at which this still image was broadcast, as learning data without distinguishing among days. That is to say, the learning data generation unit 230A may generate, from the broadcast program from which the sponsorship credit display has already been detected, the still image with the sponsorship credit display and the time at which this still image was broadcast, as well as the still image without the sponsorship credit display and the time at which this still image was broadcast, as learning data. The learning unit 240A may also learn parameters that are applied to the detection model using the learning data generated by the learning data generation unit 230A without distinguishing among days.

In general, it is often the case that the same broadcast program is broadcast in the same time slot on the same day every week. There is a tendency that such a broadcast program displays a sponsorship credit display of the same format. Therefore, the accuracy of detection of the sponsorship credit display can be further improved by generating the still image with the sponsorship credit display and the time at which this still image was broadcast, as well as the still image without the sponsorship credit display and the time at which this still image was broadcast, as learning data, and by learning parameters that are applied to the detection model using such learning data.

<Sound Recognition Unit>

Figure 11:
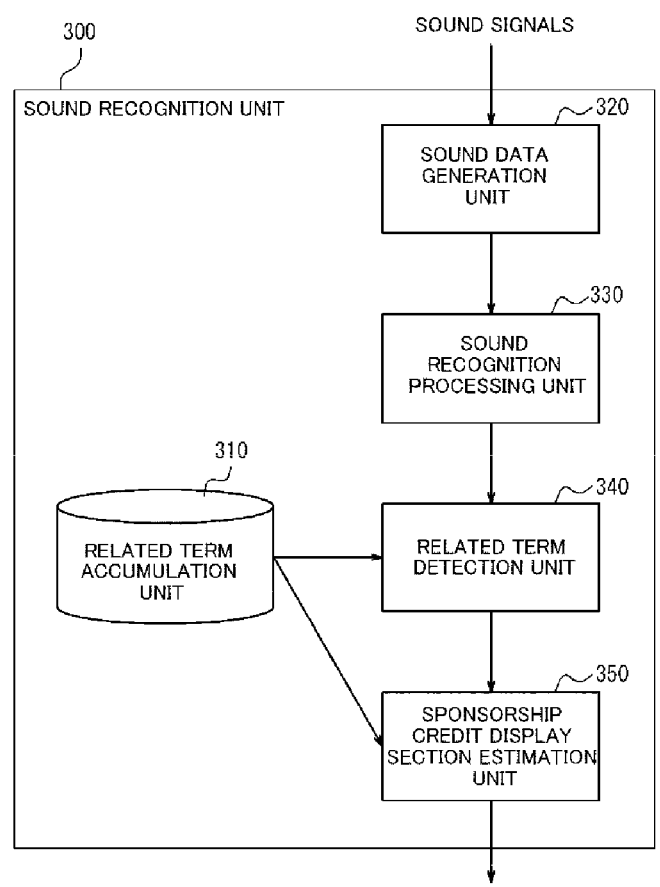
FIG. 11 is a figure showing an exemplary configuration of a sound recognition unit in the CM section detection device according to an embodiment of the present invention.

Next, the details of the sound recognition unit 300 will be described. FIG. 11 is a figure showing an exemplary configuration of the sound recognition unit 300. The sound recognition unit 300 shown in FIG. 11 includes a related term accumulation unit 310, a sound data generation unit 320, a sound recognition processing unit 330, a related term detection unit 340, and a sponsorship credit display section estimation unit 350.

The related term accumulation unit 310 accumulates related terms that are included in an announcement of a sponsorship credit display (an announcement that is made at the time of the sponsorship credit display) and related to the sponsorship credit display. Examples of the related terms include such terms as "that are currently viewed", "the sponsors", "the sponsorship", and "proudly brought (is/was proudly brought)", which are often included in the announcement of the sponsorship credit display. Examples of the related terms also include terms indicating company names and the like.

Furthermore, the related term accumulation unit 310 accumulates, in association with a related term, an estimated period obtained by estimating a predetermined period that takes place at least one of before and after the appearance time of that related term as a sponsorship credit display section. An estimated period of a related term is set in accordance with the position at which the possibility of appearance of that related term is high in the announcement of the sponsorship credit display.

For example, it is often the case that a fixed phrase "this broadcast program is/was proudly brought by the sponsorship by the sponsors that are currently viewed" is used as the announcement of the sponsorship credit display. There is a tendency that, in this fixed phrase, such related terms as "broadcast program" and "that are currently viewed" often appear in the early part of the announcement, such related terms as "the sponsors" and "the sponsorship" often appear in the middle part of the announcement, and such related terms as "proudly brought" often appear in the later part of the announcement. The estimated periods of the related terms are set based on this tendency.

For example, with respect to the related term "broadcast program" that has a high possibility of appearing in the early part of the announcement, "0 seconds to +5 seconds" is set as the estimated period. Also, with respect to the related term "the sponsorship" that has a high possibility of appearing in the middle part of the announcement, "−3 seconds to +2 seconds" is set as the estimated period. Furthermore, with respect to the related term "proudly brought" that has a high possibility of appearing in the later part of the announcement, "−4 seconds to +1 second" is set as the estimated period. Note that "−X seconds to +Y seconds" denotes a section between X seconds before the appearance time of the related term and Y seconds after the appearance time of the related term.

The sound data generation unit 320 obtains sound signals of a broadcast program targeted for detection of a sponsorship credit display from the broadcast video/sound signal accumulation unit 110. The sound data generation unit 320 decodes the obtained sound signals, generates sound signals for sound recognition in a predetermined format (e.g., WAV format, 16 kHz, 16 bits, monophonic sound signals) as sound data for sound recognition, and outputs the sound signals for sound recognition to the sound recognition processing unit 330.

The sound recognition processing unit 330 performs sound recognition with respect to the sound data for sound recognition (the sound signals of the broadcast program targeted for detection of the sponsorship credit display) output from the sound data generation unit 320. Specifically, the sound recognition processing unit 330 accumulates parameters that are applied to an acoustic model/language model for sound recognition that has been tuned for detection of the sponsorship credit display. The sound recognition processing unit 330 performs sound recognition with respect to the sound signals of the broadcast program targeted for detection of the sponsorship credit display using the acoustic model/language model to which the accumulated parameters have been applied, and outputs the result of sound recognition to the related term detection unit 340. Note that the parameters applied to the acoustic model/language model may be accumulated in a non-illustrated accumulation unit.

FIG. 12 is a figure showing an example of the result of sound recognition by the sound recognition processing unit 330. Here, the result of sound recognition with respect to sound signals of a phrase "from now on, is proudly brought by the sponsorship by the sponsors that are currently viewed" is shown.

As shown in FIG. 12, by way of sound recognition with respect to the sound signals, the sound recognition processing unit 330 divides the target phrase into a plurality of terms ("Word Name") and transcribes the target phrase as text data. The sound recognition processing unit 330 also outputs, in association with each term ("Word Name"), an ID ("Word ID") that identifies this term, the start time ("Word Start Time") of this term, and the end time ("Word End Time") of this term as the result of sound recognition.

Referring back to FIG. 11, the related term detection unit 340 detects related terms accumulated in the related term accumulation unit 310 from the result of sound recognition by the sound recognition processing unit 330, and outputs signals indicating the detection result (in the present embodiment, binary chronological signals) to the sponsorship credit display section estimation unit 350. The related term detection unit 340 outputs, for example, a signal "1" with respect to the time at which a related term was detected, and a signal "0" with respect to other times, to the sponsorship credit display section estimation unit 350. The related term detection unit 340 performs the foregoing processing at a predetermined time interval. Therefore, for example, when the broadcast program targeted for detection of the sponsorship credit display is 65-minute long and the foregoing processing is performed at an interval of 1 second, the related term detection unit 340 outputs binary chronological signals in which 3900 signals of "1" or "0" are chronologically continuous to the sponsorship credit display section estimation unit 350.

The sponsorship credit display section estimation unit 350 estimates a sponsorship credit display section based on the binary chronological signals output from the related term detection unit 340. Specifically, the sponsorship credit display section estimation unit 350 estimates a period which is based on the appearance time of a detected related term (the time corresponding to a signal "1"), and which is equivalent to the estimated period that is accumulated in the related term accumulation unit 310 in association with the detected related term, as a sponsorship credit display section. For example, assume that "−X seconds to +Y seconds" is set as an estimated period in association with a certain related term, and this related term was detected at the time t. In this case, based on the time t, the sponsorship credit display section estimation unit 350 estimates the time t−X to the time t+Y as a sponsorship credit display section. Note that the sponsorship credit display section estimation unit 350 outputs the result of sound recognition by the sound recognition processing unit 330 from the sound recognition processing unit 330 or the related term detection unit 340. By obtaining the result of sound recognition by the sound recognition processing unit 330, the sponsorship credit display section estimation unit 350 can identify to which related term a signal "1" included in the binary chronological signals is associated.

The sponsorship credit display section estimation unit 350 outputs, to the sponsorship credit display section output unit 400, a signal "1" with respect to the time that is estimated to be the sponsorship credit display section and a signal "0" with respect to other times. The sponsorship credit display section estimation unit 350 performs the foregoing processing at a predetermined time interval. Therefore, for example, when the broadcast program targeted for detection of the sponsorship credit display is 65-minute long and the foregoing processing is performed at an interval of 1 second, the sponsorship credit display section estimation unit 350 outputs binary chronological signals in which 3900 1-bit signals are chronologically continuous to the sponsorship credit display section output unit 400.

When a related term appears outside the sponsorship credit display section within the broadcast program, the sponsorship credit display section estimation unit 350 outputs a signal "1". However, in this case, if another related term does not appear before and after this term, only a period equivalent to the estimated period associated with this related term is a period in which the signal "1" is output. On the other hand, the sponsorship credit display section normally includes related terms that appear continuously, and has a length of, for example, approximately a dozen seconds. Therefore, the sponsorship credit display section can be detected with high accuracy by detecting a section in which signals "1" are continuous for a predetermined period or more as the sponsorship credit display section.

<CM Section Detection Method>

Figure 13:
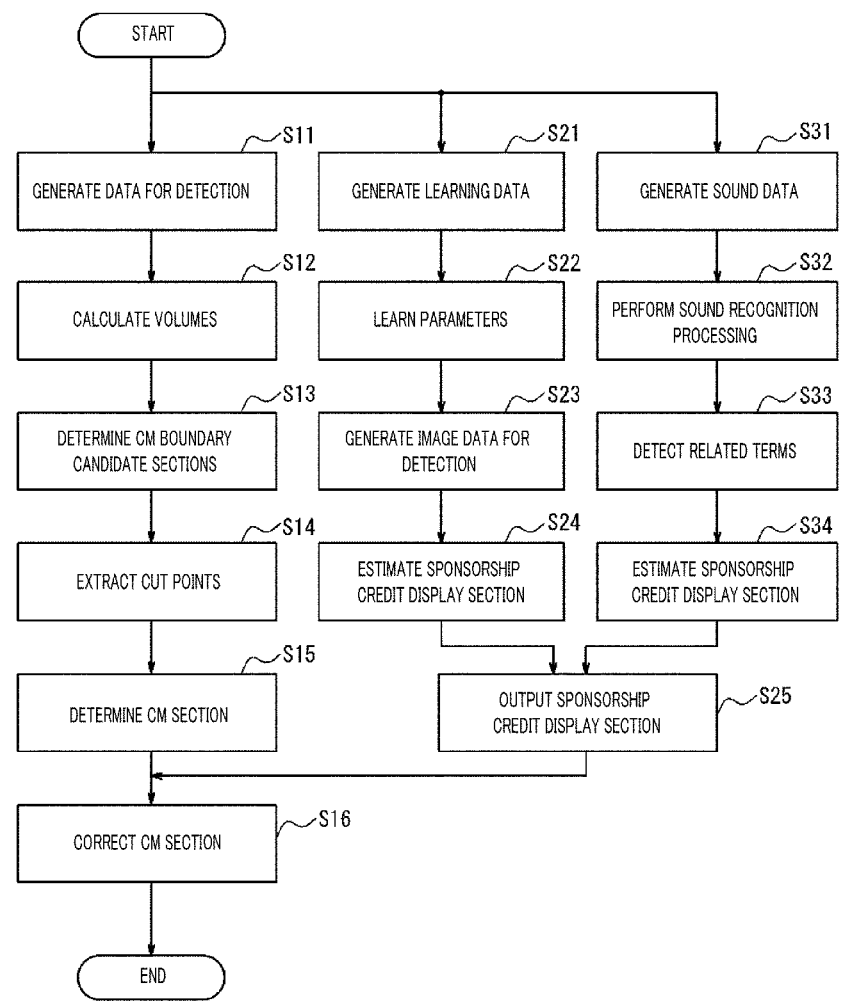
FIG. 13 is a flowchart showing an example of a CM section detection method according to an embodiment of the present invention.

Next, a CM section detection method of the CM section detection device 100 will be described using FIG. 13. FIG. 13 is a flowchart showing an example of the CM section detection method according to an embodiment of the present invention.

In step S11, using the detection data generation unit 121, the CM section detection device 100 generates sound data for CM section detection.

In step S12, using the volume calculation unit 122, the CM section detection device 100 calculates chronological volumes of the sound data generated in step S11.

In step S13, using the CM boundary candidate section determination unit 123, the CM section detection device 100 extracts low-volume sections in which the volumes calculated in step S12 are smaller than the volume threshold. Then, a portion in which an interval between neighboring low-volume sections is substantially the CM prescribed length is detected as a CM. Then, a time slot including a low-volume section at an end portion of the detected CM is determined as a CM boundary candidate section.

In step S14, using the cut point extraction unit 124, the CM section detection device 100 extracts cut points from the video of the CM boundary candidate sections determined in step S13.

In step S15, using the CM section determination unit 125, the CM section detection device 100 calculates the number of matches where the differences between the respective neighboring cut point periods and the CM prescribed length are smaller than the time difference threshold with respect to all cut point sequences $S_j$ composed of combinations of cut points within the respective CM boundary candidate sections extracted in step S14. When there is one cut point sequence $S_j$ that has the largest number of matches, the CM section detection device 100 determines this cut point sequence $S_j$ as a boundary sequence. When there are a plurality of cut point sequences $S_j$ that have the largest number of matches, the CM section detection device 100 determines, among the cut point sequences $S_j$ that have the largest number of matches, a cut point sequence $S_j$ in which the differences between the neighboring cut point periods and the CM prescribed length are the smallest as the boundary sequence. Then, using the CM section determination unit 125, the CM section detection device 100 determines cut points whose neighboring cut point periods substantially match the CM prescribed length in the boundary sequence as CM boundaries, and determines a section between neighboring CM boundaries as a CM section.

In step S21, using the learning data generation unit 230, the CM section detection device 100 generates still images with a sponsorship credit display and still images without the sponsorship credit display as learning data from video signals of a broadcast program from which the sponsorship credit display has already been detected.

In step S22, using the learning unit 240, the CM section detection device 100 learns parameters that are applied to a detection model for detecting a sponsorship credit display in a broadcast program using the learning data generated in step S21.

In step S23, using the detection image data generation unit 250, the CM section detection device 100 decodes video signals of a broadcast program targeted for detection of a sponsorship credit display, and generates chronologically continuous still images as image data for detection at a predetermined time interval.

In step S24, using the sponsorship credit display section estimation unit 260, the CM section detection device 100 estimates a sponsorship credit display section in the broadcast program targeted for detection of the sponsorship credit display using the detection model to which the parameters learnt in step S23 have been applied.

In step S31, using the sound data generation unit 320, the CM section detection device 100 generates sound data for sound recognition from sound signals of the broadcast program targeted for detection of the sponsorship credit display.

In step S32, using the sound recognition processing unit 330, the CM section detection device 100 performs sound recognition processing with respect to the sound data generated in step S31.

In step S33, using the related term detection unit 340, the CM section detection device 100 detects related terms that are related to the sponsorship credit display from the result of sound recognition obtained in step S32.

In step S34, using the sponsorship credit display section estimation unit 350, the CM section detection device 100 estimates a sponsorship credit display section based on the related terms detected in step S33.

In step S25, using the sponsorship credit display section output unit 400, the CM section detection device 100 outputs the intersection or the union of the sponsorship credit display section estimated in step S24 and the sponsorship credit display section estimated in step S34 as a final sponsorship credit display section. For example, in order to detect the sponsorship credit display section as completely as possible, the CM section detection device 100 uses the union as the sponsorship credit display section; in order to minimize the rate of erroneous detection of the sponsorship credit display section, the CM section detection device 100 uses the intersection as the sponsorship credit display section. Note that processing from step S21 to step S24 and processing from step S31 to step S34 may be performed in parallel, or one of these sets of processing may be performed first.

In step S16, using the CM section correction unit 140, the CM section detection device 100 corrects CM sections detected in step S15 based on the sponsorship credit display section detected in step S25, and outputs the corrected CM sections.

As described above, according to the present invention, the CM section correction unit 140 corrects CM sections detected by the CM section detection unit 120 using a sponsorship credit display section. Therefore, although there is a case where a sponsorship credit display section is erroneously detected as a CM section, as well as a case where a CM section immediately before or immediately after a broadcast program itself cannot be detected, before correction of CM-detected sections, such erroneous detection and missed detection can be corrected. In an experiment that was conducted with respect to one day's worth of broadcast data of five key stations in the Kanto region, the CM section detection unit 120 detected 4770 CM sections. Among these, CM sections that included a sponsorship credit display section were regarded as erroneous detections and excluded by the CM section correction unit 140; as a result, 16 erroneous detections were able to be accurately corrected. Furthermore, when an interval between a CM section and a sponsorship credit display section was substantially 15 seconds, the CM section correction unit 140 regarded this interval as a CM section and added this interval; as a result, one missed detection was able to be accurately corrected.

It is often the case that a video switchover takes place between CMs, and between a CM and a broadcast program. That is to say, it is often the case that a CM boundary is a cut point. Therefore, it is preferred for the CM section detection unit 120 to detect a CM section by extracting cut points that are time points of reproduction of frames in which the volume of sound signals of a broadcast program is lower than the volume threshold and an amount of change from a previous frame is equal to or larger than the pixel change threshold, and by comparing an interval between these cut points with the CM prescribed length. According to this method, a CM section can be detected with much high accuracy compared to a case where CM boundaries are detected based solely on the volume.

Note that in a verification experiment by the inventors, as a result of detection of CM boundaries of broadcast programs that include 742 CMs and have a reproduction period of 17 hours by the CM section detection unit 120 according to the above methods, the sum of differences from the actual CM boundaries was 3.7 seconds. In contrast, when CM boundaries were detected based solely on low-volume sections as in the conventional case, the sum of differences from the actual CM boundaries was 17.7 seconds. Also, in this verification experiment, while the precision in the conventional determination was 93.5%, the precision in the determination by the CM section detection unit 120 was 93.9%. Furthermore, while the recall in the conventional determination was 97.3%, the recall in the determination by the CM section detection unit 120 was 99.0%. Therefore, it has been verified that the CM section detection unit 120 can determine CM boundaries accurately compared to the conventional case.

Also, as the image recognition unit 200 detects a sponsorship credit display in a broadcast program targeted for detection of the sponsorship credit display using a detection model to which parameters that have been learnt using learning data in advance have been applied, sponsorship credit displays of many variations are used as learning data, and thus sponsorship credit displays of many variations as described above can be detected. Thus, CM sections can be detected with higher accuracy by correcting CM sections detected by the CM section detection unit 120 using a highly accurate sponsorship credit display section detected by the image recognition unit 200.

In addition, as the sound recognition unit 300 estimates estimated periods before and after a related term detected by sound recognition processing as a sponsorship credit display section, only a section in which related terms appear continuously can be detected as a sponsorship credit display section. There is a case where a related term appears outside a sponsorship credit display section within a broadcast program; however, as it is rare for related terms to appear continuously outside a sponsorship credit display section, the appearance of a related term that is irrelevant to a sponsorship credit display is not detected as a sponsorship credit display section, and only a section in which related terms appear continuously at the time of a sponsorship credit display is detected as a sponsorship credit display section. Thus, CM sections can be detected with higher accuracy by correcting CM sections detected by the CM section detection unit 120 using a highly accurate sponsorship credit display section detected by the sound recognition unit 300.

Although the CM section detection device 100 has been described above, it is also possible to use a computer to cause the computer to function as the CM section detection device 100. Such a computer can be realized by storing a computer program that describes processing contents that realize each function of the CM section detection device 100 in a storage unit of this computer, and by causing a CPU of this computer to read out and execute this computer program.

Furthermore, the computer program may be recorded in a computer-readable recording medium. The use of such a recording medium enables installation of the computer b program in the computer. Here, the recording medium in which the computer program is recorded may be a non-transitory recording medium. Although no particular limitation is intended with regard to the non-transitory recording medium, the non-transitory recording medium may be such a recording medium as a CD-ROM and a DVD-ROM, for example.

Although the foregoing embodiment has been described as a representative example, it is apparent to a person skilled in the art that many changes and replacements are possible within the intent and the scope of the present invention. Therefore, the present invention is not to be construed as being limited by the foregoing embodiment, and various modifications and changes can be made without departing from the claims. For example, a plurality of configuration blocks shown in the configuration figures of the embodiment can be combined into one, or one configuration block shown therein can be divided.

REFERENCE SIGNS LIST

100 CM section detection device
110 Broadcast video/sound signal accumulation unit
120 CM section detection unit
121 Detection data generation unit
122 Volume calculation unit
123 CM boundary candidate section determination unit
124 Cut point extraction unit
125 CM section determination unit
130 Sponsorship credit display section estimation unit
140 CM section correction unit
200 Image recognition unit
210 Correct metadata accumulation unit
220 Parameter accumulation unit
230, 230A Learning data generation unit
231A Initial-learning learning data generation unit
232A Day-by-day re-learning learning data generation unit
240, 240A Learning unit
241A Initial learning unit
242A Day-by-day re-learning unit
250 Detection image data generation unit
260, 260A Sponsorship credit display section estimation unit
300 Sound recognition unit
310 Related term accumulation unit
320 Sound data generation unit
330 Sound recognition processing unit
340 Related term detection unit
350 Sponsorship credit display section estimation unit
400 Sponsorship credit display section output unit

The invention claimed is:

1. A commercial (CM) section detection device for detecting a section of a CM included in a broadcast program, the CM section detection device comprising:

a CM section detector configured to:
   detect one or more CM sections within a broadcast program by extracting cut points that are time points of reproduction of frames in which the volume of the broadcast program is lower than the volume threshold and an amount of change from a previous frame is equal to or larger than a pixel change threshold, by comparing an interval between the cut points with a CM prescribed length, and by comparing the volume of the broadcast program with the volume threshold, and
   generate the detected CM sections representing the CM sections that have been detected; and
a CM section corrector configured to correct the detected CM sections based on a sponsorship credit display section, wherein the sponsor credit display section includes a section which is included in the broadcast program and a sponsorship credit indicating a sponsor of the broadcast program being displayed.

2. The CM section detection device according to claim 1, wherein, when the sponsorship credit display section is included within a CM section detected by the CM section detector, the CM section corrector is configured to exclude the CM section from the detected CM sections.

3. The CM section detection device according to claim 1, wherein, when the sponsorship credit display section exists outside a CM section detected by the CM section detector, the CM section corrector is configured to compare an interval between the CM section and the sponsorship credit display section with a predetermined period to determine whether to add the interval to the detected CM sections.

4. The CM section detection device according to claim 1, the device further comprising:
   a sponsorship credit display section estimator configured to estimate the sponsorship credit display section using a detection model, wherein parameters applied to the detection model have been learnt in advance using learning data including still images that display the sponsorship credit display, as well as still images that do not display the sponsorship credit display, in a broadcast program for learning from which the sponsorship credit display has already been detected.

5. The CM section detection device according to claim 1, the device further comprising:
   a sponsorship credit display section estimator configured to:
   detect, from a result of sound recognition with respect to sound signals of the broadcast program, a related term that is included in an announcement of the sponsorship credit display and related to the sponsorship credit display, and
   estimate a predetermined period based on an appearance time of the related term as the sponsorship credit display section.

6. The CM section detection device according claim 1, the device further comprising:
   a sponsorship credit display section configured to:
   estimate a first sponsorship credit display section in the broadcast program using a detection model,
   detect, from a result of sound recognition with respect to sound signals of the broadcast program, a related term that is included in an announcement of the sponsorship credit display and related to the sponsorship credit display,
   estimate a predetermined period based on an appearance time of the related term as a second sponsorship credit display section, and estimate an intersection or a union of the first sponsorship credit display section and the second sponsorship credit display section as the sponsorship credit display section, wherein parameters applied to the detection model have been learnt in advance using learning data including still images that display the sponsorship credit display, as well as still images that do not display the sponsorship credit display, in a broadcast program for learning from which the sponsorship credit display has already been detected.

7. A computer-implemented method for detecting a section of a commercial (CM) included in a broadcast program, the method comprising:
    detecting one or more CM sections by extracting cut points that are time points of reproduction of frames in which the volume of the broadcast program is lower than the volume threshold and an amount of change from a previous frame is equal to or larger than a pixel change threshold, by comparing an interval between the cut points with a CM prescribed length, and by comparing the volume of the broadcast program with the volume threshold;
    generating detected CM sections representing the CM sections that have been detected; and
    correcting the detected CM sections based on a sponsorship credit display section that is a section which is included in the broadcast program and in which a sponsorship credit indicating a sponsor of the broadcast program is displayed.

8. The computer-implemented method according to claim 7, wherein, when the sponsorship credit display section is included within a CM section detected by the CM section detector, the CM section corrector is configured to exclude the CM section from the detected CM sections.

9. The computer-implemented method according to claim 7, the method further comprising:
    when the sponsorship credit display section exists outside a CM section detected by the CM section detector, comparing an interval between the CM section and the sponsorship credit display section with a predetermined period to determine whether to add the interval to the detected CM sections.

10. The computer-implemented method according to claim 7, the method further comprising:
    estimating the sponsorship credit display section using a detection model, wherein parameters applied to the detection model have been learnt in advance using learning data including still images that display the sponsorship credit display, as well as still images that do not display the sponsorship credit display, in a broadcast program for learning from which the sponsorship credit display has already been detected.

11. The computer-implemented method according to claim 7, the method further comprising:
    detecting, from a result of sound recognition with respect to sound signals of the broadcast program, a related term that is included in an announcement of the sponsorship credit display and related to the sponsorship credit display, and
    estimating a predetermined period based on an appearance time of the related term as the sponsorship credit display section.

12. The computer-implemented method according to claim 7, the method further comprising:
    estimating a first sponsorship credit display section in the broadcast program using a detection model,
    detecting, from a result of sound recognition with respect to sound signals of the broadcast program, a related term that is included in an announcement of the sponsorship credit display and related to the sponsorship credit display,
    estimating a predetermined period based on an appearance time of the related term as a second sponsorship credit display section, and
    estimating an intersection or a union of the first sponsorship credit display section and the second sponsorship credit display section as the sponsorship credit display section, wherein parameters applied to the detection model have been learnt in advance using learning data including still images that display the sponsorship credit display, as well as still images that do not display the sponsorship credit display, in a broadcast program for learning from which the sponsorship credit display has already been detected.

13. A computer-readable non-transitory recording medium storing computer-executable instructions that when executed by a processor cause a computer system to:
    detect, by a CM section detector, one or more CM sections within a broadcast program by extracting cut points that are time points of reproduction of frames in which the volume of the broadcast program is lower than the volume threshold and an amount of change from a previous frame is equal to or larger than a pixel change threshold, by comparing an interval between the cut points with a CM prescribed length, and by comparing the volume of the broadcast program with the volume threshold;
    generate, by the CM section detector, the detected CM sections representing the CM sections that have been detected; and
    correct, by a CM section corrector, the detected CM sections based on a sponsorship credit display section, wherein the sponsor credit display section includes a section which is included in the broadcast program and a sponsorship credit indicating a sponsor of the broadcast program being displayed.

14. The computer-readable non-transitory recording medium according to claim 13, the computer-executable instructions when executed further causing the computer system to:
    when the sponsorship credit display section is included within a CM section detected by the CM section detector, exclude, by the CM section corrector, the CM section from the detected CM sections.

15. The computer-readable non-transitory recording medium according to claim 13, wherein, when the sponsorship credit display section exists outside a CM section detected by the CM section detector, the CM section corrector is configured to compare an interval between the CM section and the sponsorship credit display section with a predetermined period to determine whether to add the interval to the detected CM sections.

16. The computer-readable non-transitory recording medium according to claim 13, the computer-executable instructions when executed further causing the computer system to:
    a sponsorship credit display section estimator configured to estimate the sponsorship credit display section using a detection model, wherein parameters applied to the detection model have been learnt in advance using learning data including still images that display the sponsorship credit display, as well as still images that do not display the sponsorship credit display, in a broadcast program for learning from which the sponsorship credit display has already been detected.

17. The computer-readable non-transitory recording medium according to claim 13, the computer-executable instructions when executed further causing the computer system to:
- detect, by a sponsorship credit section estimator, from a result of sound recognition with respect to sound signals of the broadcast program, a related term that is included in an announcement of the sponsorship credit display and related to the sponsorship credit display, and
- estimate, by the sponsorship credit section estimator, a predetermined period based on an appearance time of the related term as the sponsorship credit display section.

* * * * *